(12) United States Patent
Yu et al.

(10) Patent No.: US 7,464,688 B2
(45) Date of Patent: Dec. 16, 2008

(54) ACTIVE RADICAL INITIATOR FOR INTERNAL COMBUSTION ENGINES

(76) Inventors: Robert C. Yu, 1034 Parkside Dr., Columbus, IN (US) 47203; Ming-Li Hsu Yu, 1034 Parkside Dr., Columbus, IN (US) 47203; Robert C. Yu, Jr., 1034 Parkside Dr., Columbus, IN (US) 47203

( * ) Notice: Subject to any disclaimer, the term of this patent is extended or adjusted under 35 U.S.C. 154(b) by 386 days.

(21) Appl. No.: 11/313,481

(22) Filed: Dec. 21, 2005

(65) Prior Publication Data
US 2007/0137611 A1    Jun. 21, 2007

(51) Int. Cl.
*F02M 43/00*  (2006.01)
*F02B 13/00*  (2006.01)
(52) U.S. Cl. ............... 123/299; 123/575
(58) Field of Classification Search ........ 123/299, 123/304, 575; 701/103–105
See application file for complete search history.

(56) References Cited
U.S. PATENT DOCUMENTS

| | | | |
|---|---|---|---|
| 4,237,831 A * | 12/1980 | Noguchi et al. | 123/51 BA |
| 4,445,468 A * | 5/1984 | Onishi et al. | 123/73 C |
| 4,603,667 A | 8/1986 | Grunwald et al. | |
| 4,787,349 A | 11/1988 | Hilger | |
| 4,846,114 A | 7/1989 | List | |
| 4,926,819 A | 5/1990 | Auwarter et al. | |
| 5,119,792 A | 6/1992 | Gu | |
| 6,092,512 A * | 7/2000 | Ma | 123/568.15 |
| 6,289,869 B1 | 9/2001 | Elliott | |
| 6,378,485 B2 | 4/2002 | Elliott | |
| 6,609,493 B2 * | 8/2003 | Yamaguchi et al. | 123/299 |
| 6,722,339 B2 | 4/2004 | Elliott | |
| 7,194,996 B2 * | 3/2007 | Koopmans | 123/295 |

* cited by examiner

*Primary Examiner*—Hieu T Vo
(74) *Attorney, Agent, or Firm*—Paul B. Overhauser; Overhauser Law Offices, LLC

(57) ABSTRACT

In an internal combustion engine a fuel-air mixture having compression temperatures and pressures sufficiently low as not to support auto ignition, ignition is achieved by injecting igniting active radicals into the air-fuel mixture. In one embodiment the active radicals are provided by withdrawing a portion of the mixture, treating it to produce active radicals in the portion and returning the portion to the mixture. Treatment of the portion typically includes simultaneously injecting, mixing, and compression of a predetermined amount of pilot fuel within the portion.

15 Claims, 6 Drawing Sheets

ACTIVE RADICAL INITIATOR FOR INTERNAL COMBUSTION ENGINES

CROSS-REFERENCE TO RELATED APPLICATIONS

The present application claims the benefit of U.S. Provisional Patent Application No. ED 500647120US filed 10 Jan. 2005, which is hereby incorporated by reference.

TECHNICAL FIELD

The present invention relates to combustion systems in internal combustion engines.

BACKGROUND OF THE INVENTION

Internal combustion (IC) engines have been the prime mover for more than a century. Nevertheless there remain opportunities for continuous improvement in key engine attributes such as specific power output, fuel economy, and exhaust emissions. The present invention represents an important discovery in the IC engine technologies to improve the above-mentioned attributes. The compression ignition direct injection (CIDI) diesel engine burns 30% to 50% less fuel as compared to a similar size homogeneous charge spark ignition (HCSI) gasoline engine, but with the disadvantages of increased nitric oxide and particulate matter emissions, start-ability, and specific power output. On the other hand HCSI gasoline engines offer the advantages of lower nitric oxide and particulate matter emissions, improved start-ability, and specific power output, but with poor fuel economy and drive-ability. A hybrid of CIDI and HCSI processes such as homogeneous charge compression ignition (HCCI) or premixed charge compression ignition (PCCI) has the potential to be highly efficient and to produce very low exhaust emissions. Nevertheless many major technical barriers must be overcome to achieve the above objectives. Significant challenges include controlling ignition timing and burn rate over all engine operating conditions, poor cold starts and transient response, and high hydrocarbons and carbon mono-oxide emissions.

For the compression ignition operations such as CIDI, HCCI, and PCCI, the formation of active radical (i.e., reactive chemical compounds such as H, OH, and HO2.) in the main fuel charge leads to ignition. The pre-ignition process is controlled mainly by hydrogen peroxide decomposition. Hydrogen peroxide decomposes into two OH radicals that are very efficient at attacking the fuel and releasing energy. Although the amount of energy liberated is at first too small to be considered ignition, these low temperature reactions quickly drive the mixture up to the 800-1,100 deg K necessary for $H_2O_2$ decomposition and main ignition, depending on the type of fuel used. The process is dominated by the kinetics of local chemical reactions. A small temperature difference inside the cylinder has a considerable effect on the ignition timing of the main fuel charge due to the sensitivity of chemical kinetics to temperature. As a result, heat transfer and mixing are important in forming the condition of the charge prior to ignition. The quality of the mixture and the fuel air ratio supplied to each cylinder should be uniform from cylinder-to-cylinder and cycle-to-cycle. However, due to the transient nature of the IC engines with continuous changing of engine operating and boundary conditions, experts in the field have been unable to control compression ignition timing by directly managing the conditions and composition of the main fuel charge through the whole cycle of intake and compression strokes. The ignition timing of a conventional diesel engine is controlled indirectly by the injection timing of the main fuel charge. That is, the start of ignition timing is equal to the start of injection timing plus ignition delay. Unless the ignition delay can be fixed or made to be near zero, the start of ignition cannot be controlled completely by the injection timing of the main fuel charge. Furthermore, for a Homogeneous Charge Compression Ignition (HCCI) or Premixed Charge Compression Ignition (PCCI) engine there is no in-cylinder direct injection timing of the main fuel charge to vary. The main fuel charge is well mixed before entering into the combustion chamber and/or before the beginning of compression stroke. Uncontrolled ignition timing leads to an uncontrolled combustion and excessive engine knocking.

Many attempts to control the compression ignition timing of a conventional direct injection diesel engine by managing directly the conditions and composition of the main charge have been unsuccessful. Some attempts were designed to improve the fuel atomization and mixture preparation processes through the use of an auxiliary compressed air supply without addressing and controlling the appropriate conditions of temperatures and pressures histories (U.S. Pat. Nos. 4,846,114 and 5,119,792). Others were to heat up the fuel spray to improve the pre-ignition process through the use of electrical heating elements but at the expense of operational safety, very high unburned hydrocarbon emissions, and compromising the main fuel charge injection characteristics (see U.S. Pat. Nos. 4,603,667; 4,787,349; 4,926,819; 6,722,339; 6,289,869, and 6,378,485). All such systems are simply not rapid and flexible enough to achieve the right conditions of temperature, pressure and mixture composition histories for a controlled ignition process. In addition, a compromise on the main injection characteristics can lead to a poor main combustion process and to very high smoke.

SUMMARY OF THE INVENTION

An object of the present invention is to overcome the deficiencies of the prior art by providing a device that separates the high temperature combustion chemical reaction of the main fuel charge from the low temperature pre-ignition chemical reaction process and that controls the ignition timing of the main fuel charge with minimum or no ignition delay.

It is a further object of the present invention to provide a device that can create a right condition of temperature, pressure, and mixture composition histories for the pre-ignition chemical reaction to proceed efficiently inside the device without any auxiliary compressed air supply or electrical heating element.

It is a further object of the present invention to provide a device that allows the pre-ignition chemical reaction to proceed without the high temperature combustion of pilot fuel air mixture inside the device in order to avoid the initiator carboning and the high heat flux generated from the high temperature reaction of pilot fuel air mixture inside the device.

It is a further object of the present invention to produce a device that produces multiple active radical plumes at a desired moment to attack the main fuel charge in a lean fuel air mixture and/or cold environments to achieve a fast energy release in the main fuel charge for high cycle efficiency and a low peak combustion temperature, resulting in very low NOx emissions.

It is a further object of the invention to provide a device that can control the start of ignition of the main fuel charge independent of the conditions of main fuel charge mixture inside the combustion chamber in order to avoid engine knocking and excessive mechanical loading on the engine structure.

It is a further object of this invention to provide a device that can allow gasoline engines to significantly improve the fuel economy, and exhaust emissions while achieving diesel-like lean operation, substantially no throttling loss and no need for a spark plug.

It is a further object of the present invention to provide a device that overcomes the major technical barriers of HCCI or PCCI processes such as controlling ignition timing and burn rate over all engine operating conditions, that avoids poor cold starts and transient response, and that avoids high hydrocarbons and carbon mono-oxide emissions.

It is a further object of the invention to provide a device that can be used to ignite the main fuel charge of a reduced compression ratio engine so as to allow the engine's specific output be significantly increased without exceeding the engine's designed mechanical loading limit.

It is a further object of the invention to provide a device that can be used as a cold starting aid or a cold start white smoke control device by an instant ignition of the main fuel charge mixture at relatively low compression temperatures caused by a low ambient temperature condition while avoiding the need for using a glow plug, an intake air heater, or an increased engine compression ratio.

It is a further object of the invention to provide a device that can be used to significantly improve the engine combustion noise by controlling the rapid rise of cylinder pressure with minimum or no ignition delay.

It is a further object of the invention to provide a device that can be applied independently in all petroleum or non-petroleum based fuel engines including gasoline, diesel, propane, kerosene, natural gas, hydrogen, methanol, ethanol, and others.

These and other objects are accomplished by the present invention which, in one aspect, comprises a method for igniting a fuel mixture contained in a combustion chamber of an internal combustion engine, the fuel mixture being sufficiently lean and/or cold to be unable to support auto ignition or spark ignition, the method comprising introducing into the mixture igniting active radicals. This may be accomplished by extracting a portion of the fuel mixture from the main combustion chamber, treating the portion to initiate active radicals in the portion and returning the portion to the mixture. Treatment of the portion typically includes simultaneously injecting, mixing, and compressing a predetermined amount of pilot fuel within the portion.

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from this detailed description.

DETAILED DESCRIPTION OF THE PREFERRED EMBODIMENTS

In one embodiment, the invention separates the high temperature combustion chemical reaction of the main fuel charge from the low temperature pre-ignition chemical reaction process. This is done by the use of an active radical initiator (ARI), in conjunction with a relatively low compression temperature and/or very lean fuel air mixture inside the main combustion chamber.

The pre-ignition chemical reaction process of the main charge is made irrelevant by operating the main fuel charge at conditions too lean and/or too cold to ignite, such that without the onset of initiator's multiple active radical plumes of the present invention, the ignition of main charge will not generally occur. A lean fuel air mixture is generally required for a high cycle efficiency and very low emissions engine.

Figure 1:
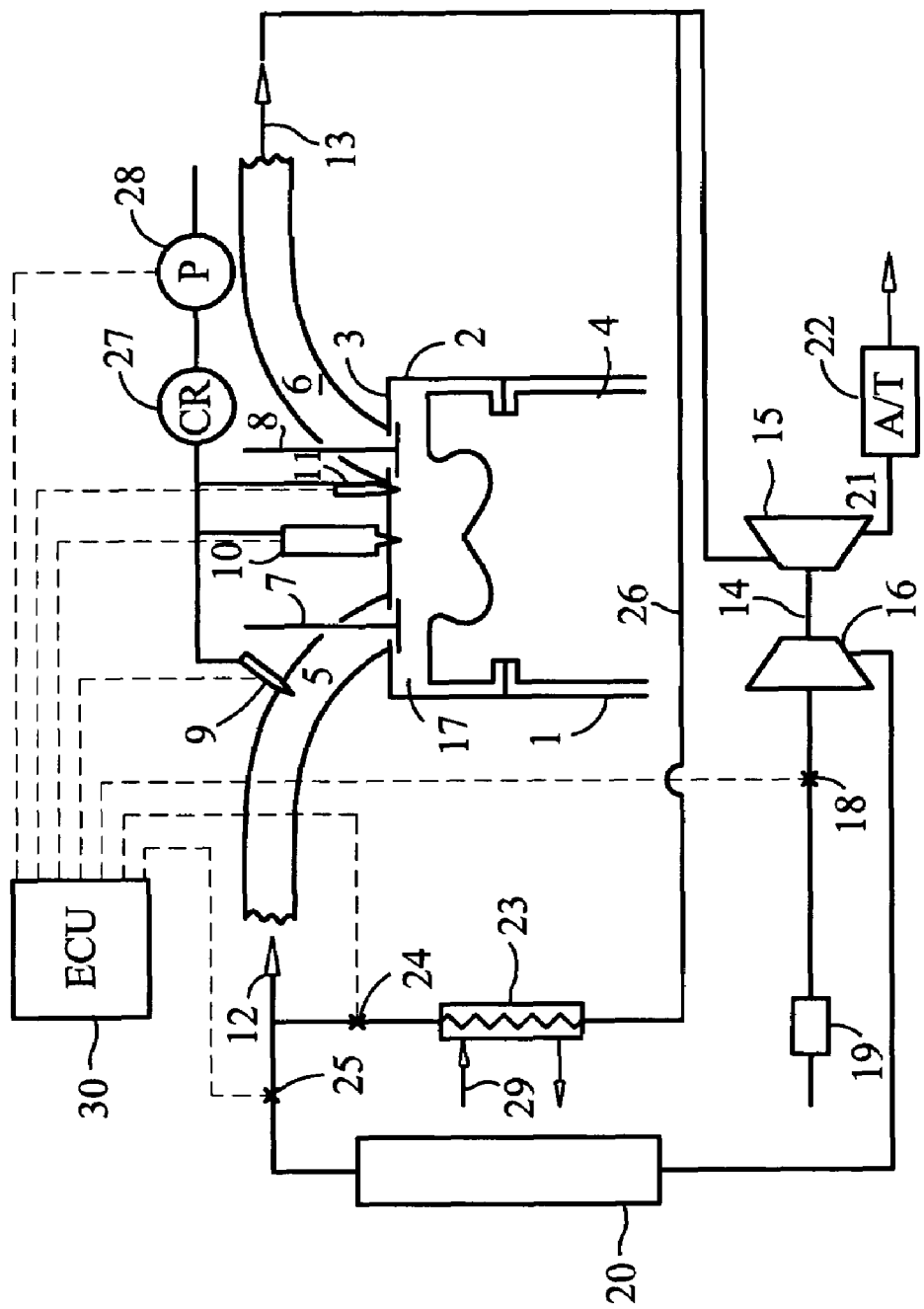
FIG. 1 is a schematic diagram depicting an internal combustion engine in accordance with one aspect of the invention.

FIG. 1 depicts schematically and in cross section a portion of an internal combustion engine pertaining to one embodiment of the present invention. The internal combustion engine is intended to represent any such engine that uses petroleum or non-petroleum based fuel such as gasoline, diesel, propane, kerosene, natural gas, hydrogen, methanol, ethanol, coal slurry and others.

Referring to FIG. 1, 1 is an engine body. The body comprises a cylinder block 2, a cylinder head 3, a piston 4, an intake port 5, an exhaust port 6, an intake valve 7, an exhaust valve 8, a port injector 9 and/or in-cylinder direct injector 10, and ARI 11. A combustion chamber 17 is formed inside the cylinder block 2, and the main fuel charge is injected from the port injector 9 and/or in-cylinder direct injector 10 into the combustion chamber 17. The in-cylinder direct injector 10 is center located in this embodiment, and can be replaced with ARI 11 when the port injector 9 is used.

The intake port 5 is connected to an intake manifold 12, and exhaust port 6 is connecting to an exhaust manifold 13. The engine is provided with a turbocharger 14. Turbocharger 14 includes turbine 15 and compressor 16. A mass flow sensor 18 is provided upstream from the compressor 16 for the purpose of measuring the intake mass flow rate. An air cleaner 19 is provided upstream from the air mass sensor 18. An intercooler 20 is provided downstream from the compressor 16 for the purpose of cooling the intake air.

The exit of the turbine 15 is connected through an exhaust pipe 21 to an after treatment device 22. The engine may also be equipped with an Exhaust Gas Recirculation (EGR) system. The EGR system comprises an EGR tube 26, EGR cooler 23, and EGR valve 24. The engine cooling water 29 is used to cool the EGR gas. An intake throttle 25 is provided upstream from the connection between the EGR tube 26 and intake manifold 12 for high EGR rate operations.

The port injector, in-cylinder direct injector, and ARI are all connected to a common rail 27 with supply pump 28. Depending on the particular engine and means of introducing the main fuel charge into the combustion chamber, the fuel supply arrangement may be varied. A very high common rail pressure is only required when the main fuel charge is injected into a conventional direct injection diesel engine with a high pressure common rail fuel system.

An electronic control unit (ECU) 30 is provided for the purpose of electronically controlling the engine operation including port injection, in-cylinder injection, EGR valve, intake throttle, and ARI retraction and compression timing to meet the combustion and operation requirements of the present invention. As described here, the precise timing of when the ARI should inject its active radical charge into the main combustion chamber will depend on the operating environment of the engine, including factors such as fuel type, engine compression ratio, engine displacement, aftertreatment device, engine speed, engine load or fuel rate, charge air temperature and pressure, engine intake air flow rate, exhaust gas recirculation rate, fuel injection characteristics, engine coolant and lube temperatures, and other key engine parameters, etc. Generally, the timing should be set for the combustion to occur slightly before engine top dead center for best cycle efficiency with optimum heat release placement.

As shown here the present embodiment is a turbocharged engine, however, the present invention may also be effective in a natural aspirated (NA) or two stroke internal combustion engines.

Figure 2:
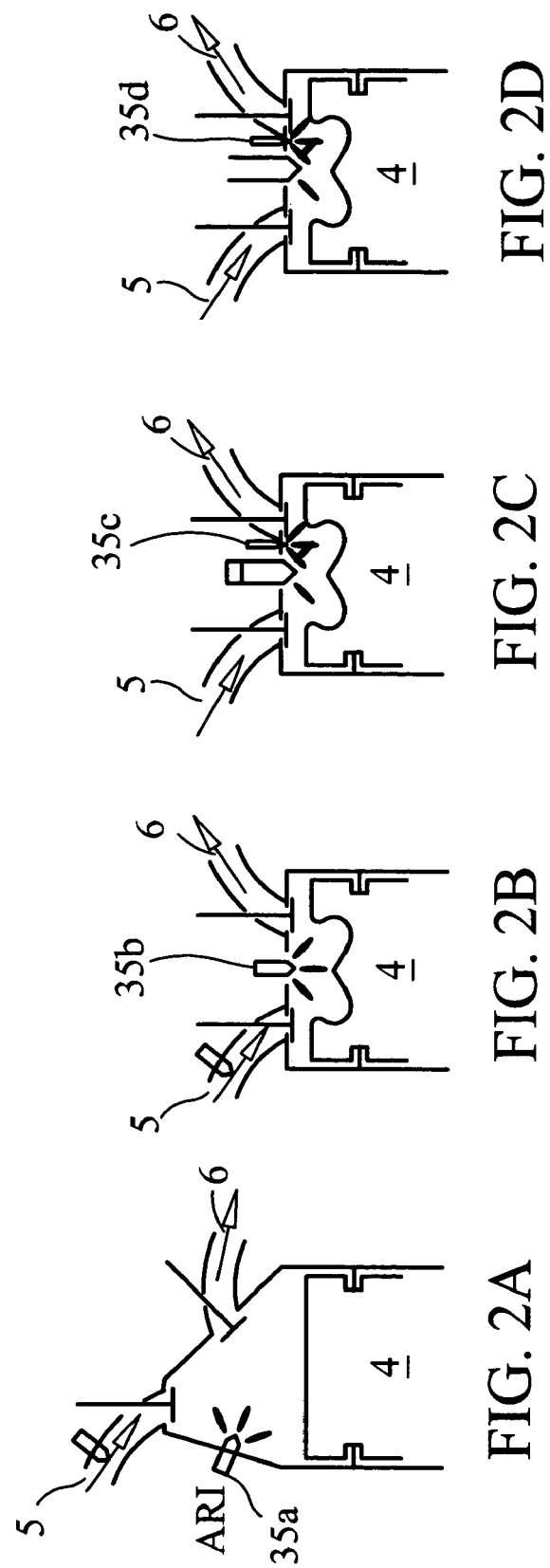
FIGS. 2(a)-2(d) are schematic descriptions of the potential application of present invention, for, respectively, spark ignited gaseous or liquid fueled engine; diesel, HCCI, PCCI, or their derivative, engines; conventional diesel engine with reduced compression ratio for higher specific output; and as a cold starting aid and cold start white smoke control device at a very cold ambient conditions.

As shown in FIG. 2 that there are many applications of ARI. The application details and benefits are described as follows, FIG. 2a. shows application of the ARI (35a) to spark ignited gaseous or liquid fueled engines including gasoline, methanol, ethanol, methane, propane, natural gas, hydrogen, and etc. For all the conventional spark ignited engines the throttling of the intake charge is required at idle and light load conditions to avoid engine misfire and high unburned hydrocarbons and carbon mono-oxide emissions at the expense of throttling loss. With the substitution of ARI (35a) for a spark ignition system, the modified engine can be operated at ARI mode at idle and light load conditions, and gradually transition to ARI+HCCI mode at medium and high load conditions with a diesel like cycle efficiency and very low exhaust emissions. This is believed to be partly due to the ability of ARI to ignite and combust a mixture that is too lean to support a self-sustaining and propagating flame front with multiple active radical plumes thereby allowing a charge leaner than is possible in a conventional spark ignited engine, and partly the ability of ARI to precisely time the start of combustion of the main fuel charge where the vast majority of the premixed charge will burn by compression ignition without the presence of a self-sustaining and propagating flame front such as in a spark ignited engine with clean burning, faster heat release, and optimum heat release placement. The above engines can be further optimized with a center located ARI, improved combustion chamber design, and higher compression ratio. There is no need for the ARI to be located on the cold side of the combustion chamber, as is often true with spark plugs, to avoid engine knocking. The ECU 30 can effect the transition between ARI and ARI+HCCI operating modes.

FIG. 2b shows application of the ARI (35b) to diesel, HCCI, PCCI, or its derivatives. The use of ARI (35b) in conjunction with in-cylinder temperature and composition control can prevent the main fuel charge from auto-ignition. The ignition timing of the main fuel charges can be controlled entirely by the onset timing of the multiple active radical plumes of ARI. In one embodiment, the invention overcomes the major technical barriers of Homogeneous Charge Compression Ignition (HCCI) or Premixed Charge Compression Ignition (PCCI) processes such as controlling ignition timing and burn rate over all engine operating conditions, poor start-ability, poor transient response, and high hydrocarbons and carbon mono-oxide emissions. Also, on some embodiments, improvements in key engine attributes such as specific power output, fuel economy, and exhaust emissions are realized. The existing HCCI and PCCI engines without the present invention can only operate at HCCI or PCCI modes at very limited operating conditions such as part load to medium load, and need to revert to conventional Homogeneous Charge Spark Ignition (HCSI) or Compression Ignition Direct Injection (CIDI) mode at idle, light load, high load, high speed, and for cold start to avoid the uncontrolled combustion, poor start-ability, and high hydrocarbons and carbon monoxide emissions. ARI, ARI+HCCI, and ARI+PCCI engines can operate on gasoline, diesel, and alternative fuels.

Figure 3:
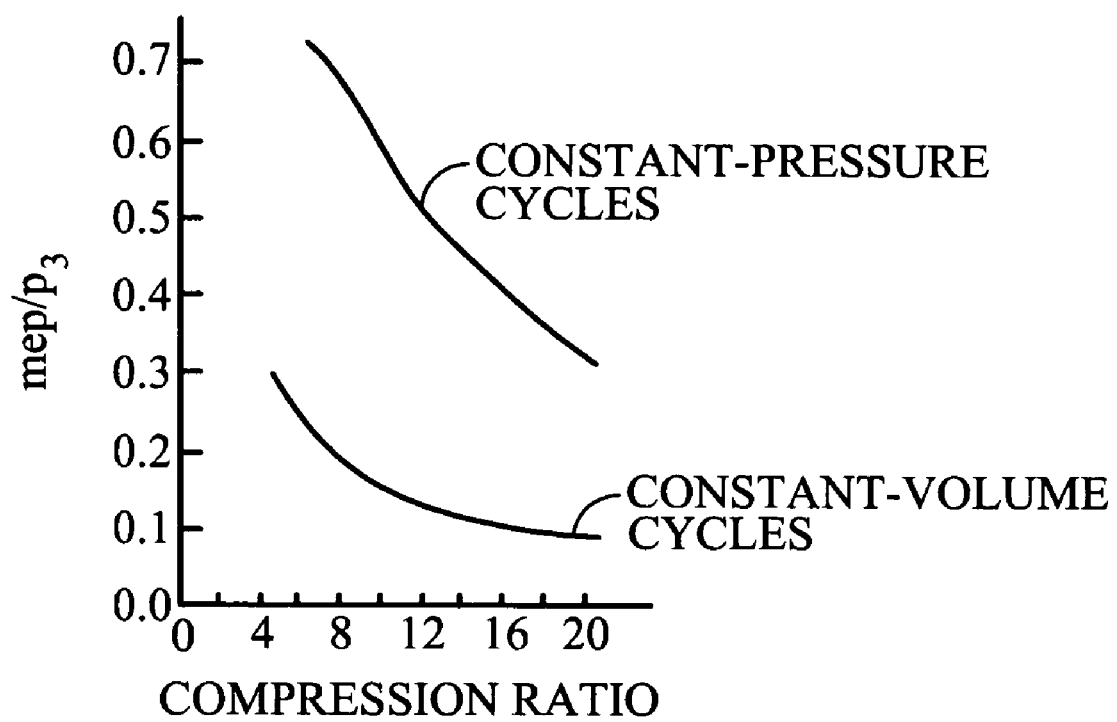
FIG. 3 is a graphs showing the relationship between mean effective pressure-to-peak cylinder pressure ratio and engine compression ratio.

FIG. 2c shows the application of the ARI (35c) to a conventional diesel engine with reduced compression ratio for higher specific output, As shown schematically in FIG. 3, for both a constant pressure and a constant volume cycle the mean effective pressure (i.e. engine output)-to-peak cylinder pressure limit can be substantially increased with a lower compression ratio. The major technical barrier of implementing such an approach is that there is a conflicting requirement in engine compression ratio between the engine start-ability and engine specific output. A good start-ability will require a higher compression ratio; On the contrary, a higher engine specific output will require a lower compression ratio to keep the engine operating within the peak cylinder pressure design limit. In one embodiment, the ability of API to generate multiple active radical plumes to ignite the main fuel charge at a much lower compression temperature and pressure can allow a lower compression ratio high specific output engine to be developed with excellent start-ability and cold start white smoke.

FIG. 2d. shows application of an ARI (35d) as a cold starting aid and cold start white smoke control device at a very cold ambient conditions. With the addition of an ARI to a conventional diesel engine, the ARI can be used as a cold stating aid or a cold start white smoke control device to ignite the main fuel charge mixture at relatively low compression temperatures caused by a very low ambient temperature conditions. No glow plug, intake air heater, variable valve timing, or variable compression ratio are required.

Figure 4A:
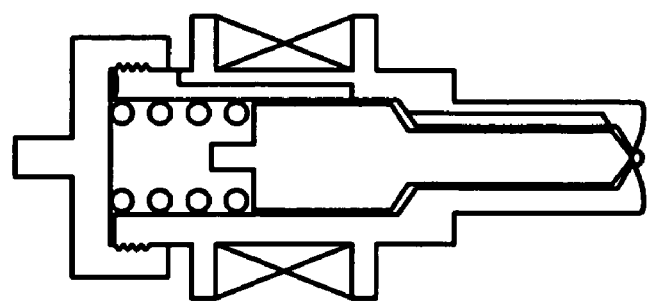
FIGS. 4(a)-4(d) is a cross sectional view of an active radical initiator (ARI) during four engine stroke instants, namely, the intake, compression, expansion and exhaust strokes.
Figure 4B:
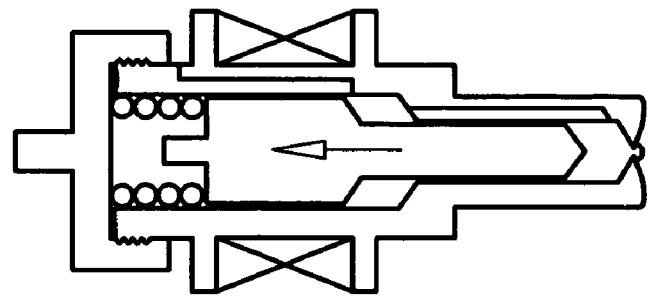

As shown in FIG. 4a, during the engine intake stroke the ARI plunger is seated to avoid the slippage of residual fuel into the main combustion chamber and, subsequently, unburned hydrocarbons and carbon monoxide emissions. No communication between main combustion chamber and ARI mixing & compression chamber is allowed during the engine intake stroke for both ARI durability and poor exhaust emissions concerns As shown in FIG. 4b, at some point during the compression stroke the ARI plunger is beginning to retract and to draw the prescribed amount of compressed charge into the ARI mixing & compression chamber for the active radical generation. The timing of retraction will depend on the engine design features and operating conditions. The higher the engine boost the more retarded is the retraction timing. Similarly, the higher the engine speed, the more advanced is the retracing timing. The size of metering and mixing & compression chambers is carefully matched to the main engine design and application.

Figure 4C:
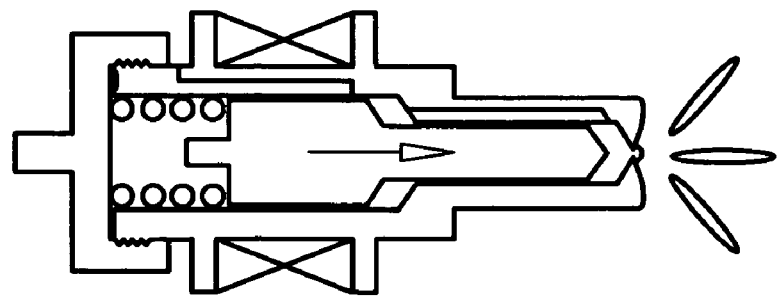

As shown in FIG. 4c, at some crank angle degree before the prescribed ignition timing of the main charge the ARI plunger will descend, and start the simultaneous injection, mixing and compression processes for active radical generation. The compression temperature, compression pressure, and mixture composition of ARI can be optimized by controlling the retracting and compression timings, and the sizes of upper metering chamber and lower mixing & compression chamber inside the ARI to achieve the optimum active radical generation to ignite the main fuel charge at the precise timing. Too much compression of mixture may lead to high temperature combustion and carboiling inside the ARI, resulting in poor active radical generation and ARI durability.

Figure 4D:
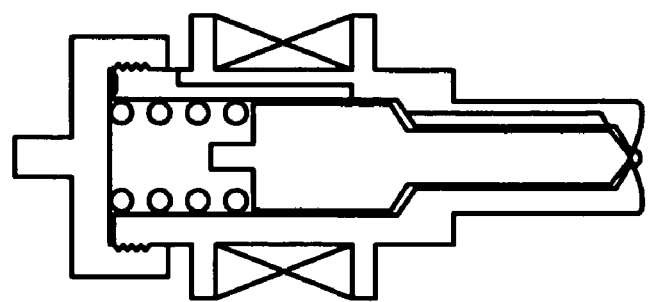

As shown in FIG. 4*d* at the end of active radical generation and injection processes, the ARI plunger will remain seated all the way through the expansion and exhaust strokes. No communication between main combustion chamber and ARI active radical preparation chamber is allowed for unburned hydrocarbons and initiator carboning controls.

The device shown in various stages of operation in FIGS. 4(*a*) to (*d*) is representative of any device that is useful in performing the Active Radical Initiation method of the present invention when in communication with an internal combustion engine's combustion chamber when the chamber contains a fuel mixture that is sufficiently lean and/or cool to be unable to support auto ignition. An ARI within the scope of the present invention can be designed to meet a variety of design goals, but an ARI generally performs the following functions:

1. Separates a controllable pre-ignition chemical reaction process of the pilot fuel charge inside the ARI from an uncontrollable pre-ignition chemical reaction of the main charge inside the combustion chamber, to allow the ignition timing of the main charge be controlled without delay between the onset of multiple active radical plumes and the ignition of the main fuel charge.
2. Draws in a controlled amount of the compressed charge to the ARI mixing & compression chamber at the appropriate time for the preparation of active radical generation process.
3. Meters a controlled amount of pilot fuel for the preparation of active radical generation process.
4. Simultaneously injects, mixes, and compresses the predetermined amount of pilot fuel and compressed charge for the controlled pre-ignition chemical reaction and active radical plumes generation.
5. Injects active radical plumes for a controllable ignition timing of the main charge.
6. Liberates an adequate amount of ignition energy and a high concentration of active radical plumes for a combustion of the main fuel charge. In one embodiment, the amount of energy liberated by the ARI to attack the main fuel charge for the start of the ignition is greater than the energy liberated by the spark or plasma plugs used in the today's spark ignited engines. The amount of energy liberated and active radical generated by ARI can also be further optimized by adjusting the amount of pilot fuel into the ARI. This high ignition energy and high active radical concentration will allow the combustion of main fuel charge to proceed at much leaner conditions, which result in lower peak combustion temperatures and lower NOx emissions. The leaner the main charge mixture, the higher the ignition energy and active radical concentration are required for the combustion of main fuel charge to achieve a fast and clean combustion with optimum heat release placement for high engine cycle efficiency and ultra low exhaust emissions.
7. Provides adequate fueling capacity to act as a direct injector for starting and light load operations without the introduction of additional fueling into the combustion chamber by either port injector or in-cylinder direct injector.
8. The functioning of the ARI can shorten the time of pre-ignition process significantly as compared to the main charge pre-ignition process to minimize the impact of heat transfer and boundary conditions on pre-ignition process.

As mentioned earlier, due to the transient nature of the engine operating conditions and the sensitivity of the pre-ignition process to the small change in temperature and mixture quality inside the combustion chamber it is almost impossible to have a controllable pre-ignition chemical reaction through the very long intake and compression processes inside the combustion chamber.

Figure 5:
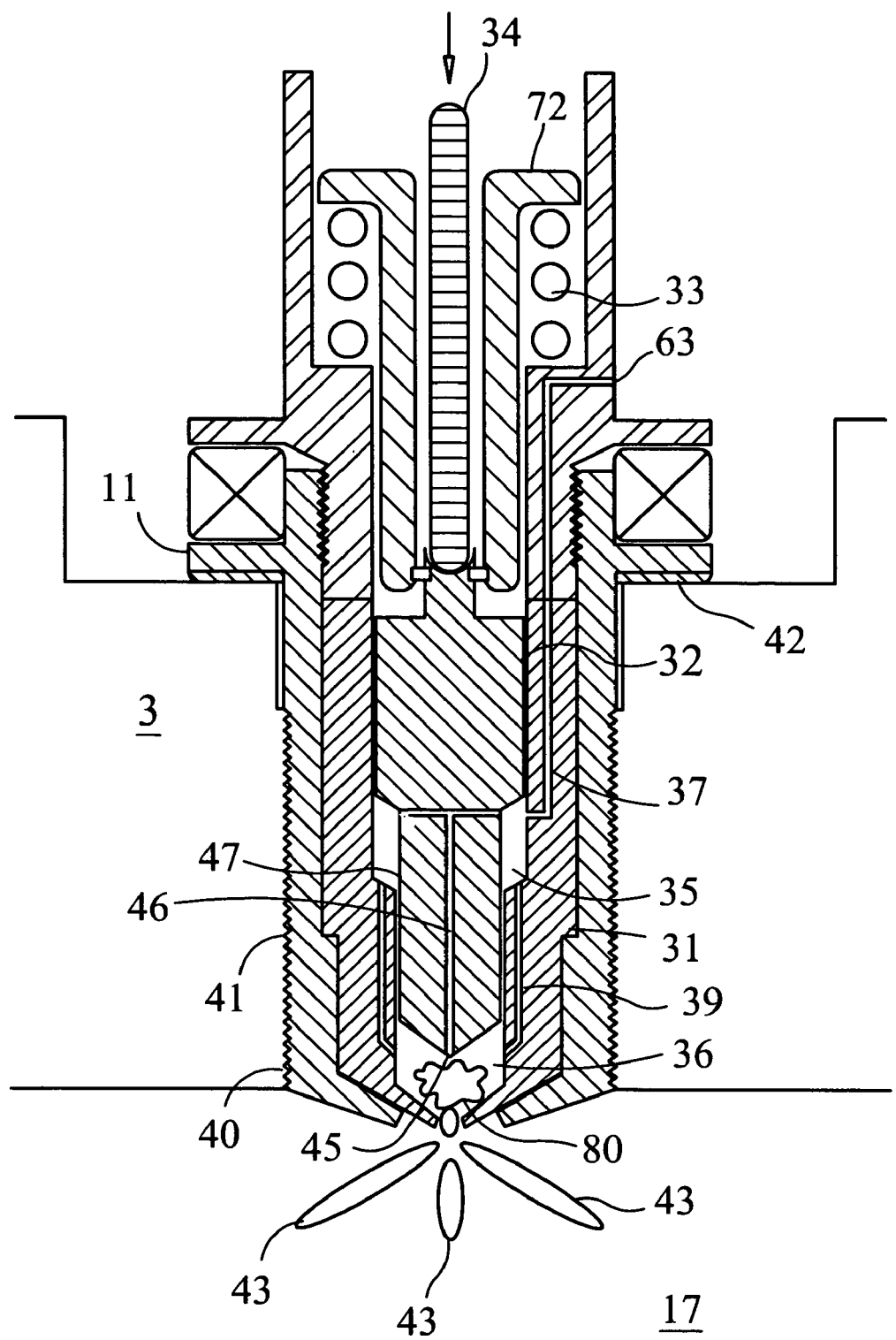
FIG. 5 is a cross sectional view of an active radical initiator (ARI).

Some or all of these design goals are met by the ARI design shown schematically in FIG. 5. The ARI housing 11 of FIG. 5 includes a nozzle body (31), plunger (32), return spring (33), and the descending and drive mechanism of reciprocable plunger (32) which has plume ejecting end 45 oriented toward the nozzle of and mixing and compression chamber (36). A maximum volume of pilot fuel metering chamber (35), and a maximum volume of pilot fuel mixing and compression chamber (36) is created when the ARI plunger is fully retracted. These maximum volumes are determined based on engine site and application requirements. The fuel metering chamber (35) and mixing and compression chamber (36) together comprise an interior chamber. Plunger 32 and/or nozzle body (31) has an interior passageway 46 and/or 39 respectively between fuel metering chamber (35) and mixing and compression chamber (36).

Figure 6A:
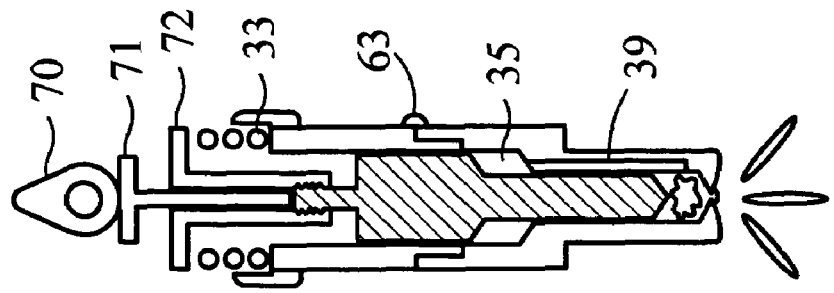
FIGS. 6a, 6b and 6c are schematic diagram showing electromagnetic, hydraulic and cam drive mechanisms for the ARI.
Figure 6B:
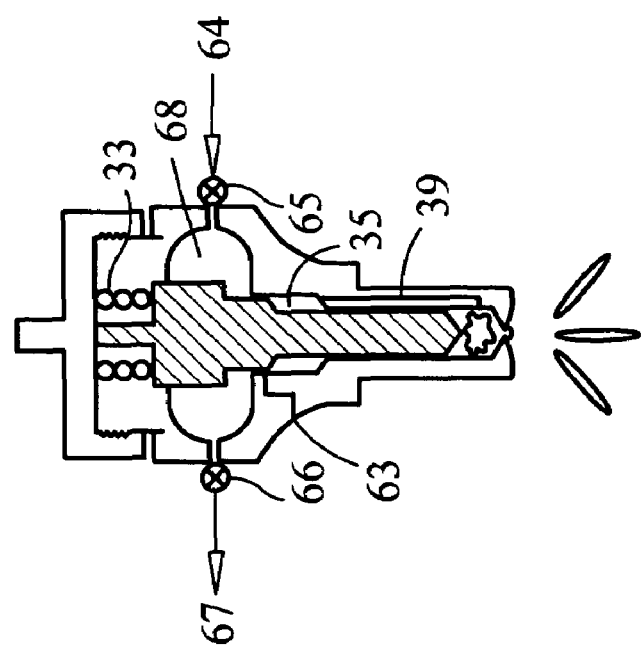
Figure 6C:
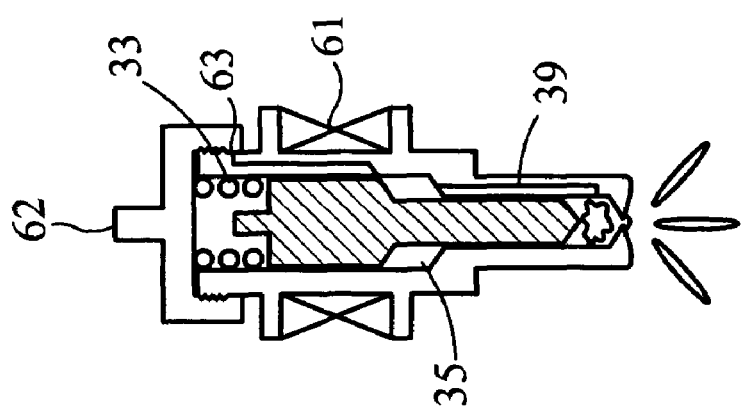

As the ARI plunger is descending both metering chamber 35 and mixing & compression chamber 36 are beginning to decrease to provide compression and mixing energies for the injection, mixing, and compression processes to proceed simultaneously. The pilot fuel inside the metering chamber 35 is supplied through the pilot fuel supply means/feed port of nozzle body (37); the amount of pilot fuel metered is determined by the feed port opening duration, feed port fuel pressure, and size of the metering chamber. The feed port is completely closed during the simultaneous injection, mixing, and compression processes. The descending motion of plunger link (34) and plunger coupling (72) can be accomplished by any one of various conventional means, such as cam drive, hydraulic drive, or electromagnetic drive, as shown in FIGS. 6*a*-6*c*. The selection of each approach may depend on the design of the engine and space available for the incorporation of ARI. In general, a cam drive system offers simplicity, but hydraulic or electromagnetic systems offer flexibility. The compression spring (33) retracts plunger (32). The injection and mixing of pilot fuel is accomplished, as shown in FIG. 5, by introducing the pilot fuel from fuel supply inlet (63) to metering chamber (35), then injecting into mixing & compression chamber (36) either through plunger fueling passage (46), or through the nozzle body fueling passage (39). The fuel in mixing & compression chamber is represented as mixture cloud 80 in the chamber. Sufficient mixing can be achieved by either or both methods. Final selection can be based on the ease of manufacturing and initial cost. Preferable, the injection & mixing of pilot fuel, and compression of the prepared fuel-air mixture, occurs simultaneously to achieve the optimum conditions of temperature, pressure, and mixture composition histories to achieve the best yield of active radical formation without high temperature combustion reaction inside the ARI. The direction and number of active radical plumes 43 are optimized by the nozzle tip hole geometry to achieve the multiple ignition sites for a fast and clean combustion process.

ARI housing 11 may have external threads 40 that mate with internal threads 41 of cylinder head 3, and be sealed thereto via washer 42.

As shown in FIG. 6*a*, and electromagnetic drive system for the ARI may be driven by solenoid coil 61, and the fuel supply 63 may be introduced to metering chamber 35 via fueling passage 37.

As shown in FIG. 6b, a hydraulic drive system may be utilized by incorporating a hydraulic supply 64 through one way valve 65 into interior chamber 68. A corresponding outlet one way valve 66 and outlet port 67 may be incorporated into the opposing side of the ARI.

As shown in FIG. 6c, a cam drive system may be utilized by incorporating a cam 70 that drives push rod 71 through plunger coupling 72.

The ARI of the present invention finds application in a variety of combustion systems including internal and external to help achieve low exhaust emissions and high cycle efficiency. The system can be applied to petroleum and non-petroleum based fuels including gasoline, diesel, kerosene, methanol, ethanol, natural gas, propane, hydrogen, and etc. The system can also be applied for both mobile and stationary applications including any automotive, industrial, marine, military, and power generation.

We claim:

1. An active radical initiator (ARI) for an internal combustion engine comprising:
    a housing having an interior chamber and nozzle
    means for supplying fuel,
    a plunger reciprocable within the interior chamber, the plunger adapted to define a pilot fuel metering chamber and a mixing and compression chamber, the plunger being movable between extended and retracted positions, such that when in the retracted position, the plunger defines a pilot fuel metering chamber within the interior chamber of the API, wherein fuel is capable of being introduced to the pilot fuel metering chamber through the means for supplying fuel, and when the plunger is moved toward its extended position, the plunger is operable to reduce the volume of the pilot fuel metering chamber and to block the means for supplying fuel, to thereby force pilot fuel from the pilot fuel metering chamber into the mixing and compression chamber, the plunger comprising a plume ejecting end oriented toward the nozzle of the interior chamber, an interior passageway between the pilot fuel metering chamber and mixing and compression chamber.

2. The active radical initiator of claim 1 further comprising:
    a mixing and compression chamber within the active radical initiator defined by the plume ejecting end of the plunger and the nozzle end of the interior chamber when the plunger is in its retracted position, and wherein movement of the plunger from its extended position toward its retracted position occurs during the compression stroke to thereby withdraw a portion of unignited fuel mixture from the main combustion chamber into the mixing and compression chamber.

3. The active radical initiator of claim 2 wherein the plunger remains in its extended position during the intake and exhaust strokes and there is no communication between main combustion chamber and active radical initiator during intake and exhaust stroke.

4. An internal combustion engine comprising at least one main combustion chamber in communication with an active radical initiator adapted for introducing igniting active radicals into a homogeneous or heterogeneous fuel mixture that is too lean and/or too cold to support auto ignition or spark/plasma ignition, or to support a self-sustaining and propagating flame front in the main combustion chamber to thereby cause the active radicals to ignite and combust the fuel mixture in the main combustion chamber for a controlled start of combustion with minimum or no ignition delay.

5. The internal combustion engine of claim 4 further comprising an engine control operable to control the timing of retraction and descent of an ARI plunger for withdrawing a portion of the fuel mixture, treating the portion to initiate active radicals generation, thereby controlling the timing of introduction of the igniting active radicals into the fuel mixture in the main combustion chamber, wherein the engine control unit is responsive to the engine operating conditions.

6. The internal combustion engine of claim 5 wherein the AM plunger is moved by a driver selected from the group consisting of a cam arrangement, a hydraulic arrangement, an electronic arrangement and combinations thereof 7. The internal combustion engine of claim 4 further comprising means for introducing igniting active radicals into the fuel mixture via at least two plumes.

8. A device for initiating active radicals in a fuel mixture comprising a pilot fuel metering chamber and a pilot fuel mixing and compression chamber in which the fuel mixture may be prepared and compressed to create igniting active radicals by a plunger operating in cooperation with a nozzle body and at least one nozzle hole through which the mixture containing igniting active radicals may exit the mixing and compression chamber.

9. The device of claim 8 wherein the plunger is operated by a driver selected from the group consisting of mechanical systems, hydraulic systems, electrical systems and combinations thereof.

10. The device of claim 8 positioned in communication with a main combustion chamber of an internal combustion engine and adapted to withdraw a portion of a mixture contained in the combustion chamber through the at least one nozzle passage and to returned through the at least one nozzle passage igniting active radicals into the mixture inside the main combustion chamber, thereby initiating combustion of the mixture.

11. The device of claim 8 wherein the timing of the withdrawal of the portion and the return of the igniting active radicals is responsive to the conditions of the mixture inside the main combustion chamber.

12. The device of claim 8 wherein the igniting active radicals are injected into the mixture inside the main combustion chamber in multiple plumes.

13. A method for igniting a fuel:air mixture in a combustion chamber in an internal combustion engine, the mixture having a fuel:air ratio and temperature that will not support auto ignition or spark/plasma ignition, or to support a self sustaining and propagated flame front, the method comprising introducing into the mixture igniting active radicals.

14. The method of claim 13, further comprising the step of comprising withdrawing a portion of the mixture from the main combustion chamber, simultaneously compressing, injecting, and mixing a predetermined amount of pilot fuel within the portion sufficiently to create igniting active radicals therein and returning the igniting active radicals to the mixture.

15. The method of claim 13 wherein the fuel mixture is too lean or too cold to auto-ignite inside the main combustion chamber.

* * * * *